United States Patent [19]

Becker

[11] Patent Number: 4,807,165

[45] Date of Patent: Feb. 21, 1989

[54] METHOD FOR THE DETERMINATION AND DISPLAY OF SIGNAL ARRIVAL TIME, INTENSITY AND DIRECTION

[75] Inventor: Farrel M. Becker, Kensington, Md.

[73] Assignee: Crown International, Inc., Elkhart, Ind.

[21] Appl. No.: 115,469

[22] Filed: Oct. 30, 1987

[51] Int. Cl.[4] .................. G04F 10/00; G01S 9/68; G01S 3/80

[52] U.S. Cl. ................. 364/569; 367/104; 367/124

[58] Field of Search .......... 364/569; 367/104, 7, 367/124, 125; 381/18, 58, 59

[56] References Cited

U.S. PATENT DOCUMENTS

| 3,112,484 | 11/1963 | McKeown | 367/104 |
|---|---|---|---|
| 3,466,652 | 9/1969 | Heyser | 367/101 |
| 3,713,087 | 1/1973 | Bauer et al. | 367/124 |
| 3,889,226 | 6/1975 | Hildebrand | 367/104 |
| 3,922,506 | 11/1975 | Frye | 381/58 |
| 4,198,705 | 4/1980 | Massa | 367/124 |
| 4,279,019 | 6/1981 | Heyser | 364/553 |
| 4,332,979 | 6/1982 | Fischer | 381/18 |
| 4,604,719 | 8/1986 | Stanley | 364/721 |

FOREIGN PATENT DOCUMENTS 0149875 7/1986 Japan ..................... 367/7

Primary Examiner—Parshotam S. Lall
Assistant Examiner—Tuan Duong
Attorney, Agent, or Firm—James D. Hall

[57] ABSTRACT

A method for the determination and display of signal arrival time, intensity, and direction for use with time domain measurements. The method may be implemented by either hardware or by software and includes obtaining at least four separate time domain measurement, such as energy time curves (ETCs), at ninety degree intervals on a horizontal plane. Opposing ETCs are differenced to obtain X and Y Cartesian components. For display in a polar format to illustrate the direction of arrival the X and Y components are converted into an angular value. The angular value determining the theta angle and either the time of arrival or intensity expressed in X and Y components establish the polar vector length. To display a three dimensional space two more ETCs are obtained in a vertical plane and correlated in the manner described above.

8 Claims, 1 Drawing Sheet

METHOD FOR THE DETERMINATION AND DISPLAY OF SIGNAL ARRIVAL TIME, INTENSITY AND DIRECTION

BACKGROUND OF THE INVENTION

This invention relates to the field involving the generation and display of energy time curves (ETCs) and will have special, but not limited, application to a method of correlating and displaying ETCs for the determination of acoustical characteristics in room such as a concert hall Such method including the determination and display of the ETCs' arrival time, intensity and direction for visually approximating the room's acoustical configuration.

In the musical industry, it is often desirous to determine the acoustical characteristics of a concert hall to maximize the sound of the hall so that each listener may enjoy the complete sound of the performing musicians. Such concert halls have individual characteristics and problem areas. Characteristics of such halls include reflection points i.e. where a sound at a given frequency is reflected and absorbtion points i.e. where sound at a given frequency is absorbed and not reflected. To determine such characteristics a time delay spectrometer may be used to transmit a test signal which sweeps through a desired frequency range and then receives the reflected frequencies through a microphone. Through processing, the reflected frequencies are displayed to indicate to the user general areas of specific frequency reflection or specific frequency absorption. The user then applies this information to alter the hall's physical makeup via additions of reflectors in areas of high absorption and absorbers in areas of high reflection to maximize the total sound of the hall.

Heretofore, the above mentioned method of determining the acoustical characteristics of a concert hall or similar room has used a single ETC generated by a time delay spectrometer which receives the reflected frequencies from an omni-directional microphone. This method, disclosed in U.S. Pat. Nos. 3,466,652 and 4,279,019 and in an article written by Richard C. Heyer entitled *Acoustical Measurements by Time Delay Spectrometry*, printed in the October 1967 issue of the Journal of the Audio Engineering Society, results in the loss of specific directional information essential to accurate acoustical measurements.

SUMMARY OF THE INVENTION

The method of this invention eliminates the above measuring inaccuracy by using a directional microphone and a two port time delay spectrometer to collect at a minimum four standard ETCs at 90° intervals. The ETCs are processed either by computer analysis or by discrete components such as filters to yield directional data as well as intensity.

Accordingly, it is an object of this invention to provide a method for the determination and display of ETC arrival time, intensity, and direction for use in acoustical and nonacoustical applications.

A further object of this invention is to provide for a method for the determination and display of ETC arrival time, intensity, and direction for use in time delay spectrometry.

Further objects of this invention will become apparent upon a reading of the following description.

DESCRIPTION OF PREFERRED METHOD

The preferred method herein disclosed is not intended to be exhaustive or to limit the invention to the precise form disclosed. It is chosen and described to enable others skilled in the art to utilize its teachings.

The method of this invention may be implemented in conjunction with discrete components to generate and correlate the ETCs such as described in U.S. Pat. Nos. 3,713,087 and 4,279,019 or by programming an existing system used for the generation and display of ETCs such as depicted in U.S. Pat. No. 4,604,719, both incorporated herein by reference. The apparatus and method of U.S. Pat. Nos. 4,604,719 and 4,279,019 are implemented in a machine sold under the name Tef System 10/12 manufactured by Tecron a division of Orown International. The method of this invention involves the use of a cardioid or unidirectional microphone and will be described as used with a Time Delay Spectrometer (TDS) as shown in U.S. Pat. No. 4,604,719 and as embodied in the Tef System 10/12 machine both mentioned above. It should be noted that although the use of the claimed method is disclosed in conjunction with time delay spectrometry, this method has application in fast fourier transform, seismic or sonar operations as well as any other application implementing ETCs as well as impulse and other time domain measurements.

Figure 1:
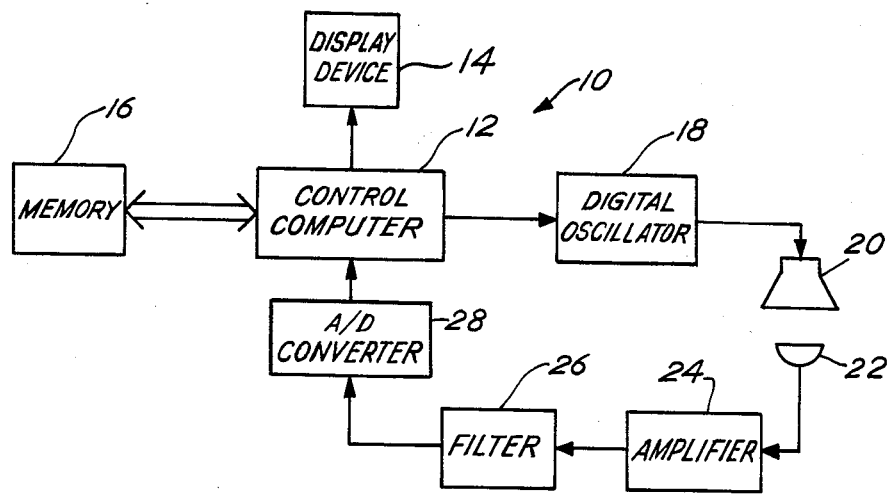
FIG. 1 is a block diagram of a time delay spectrometer for use with the method of this invention.

The Time Delay Spectrometer (TDS) 10 described for utilization of the method of this invention is illustrated in block form in FIG. 1. TDS 10 includes a controlling computer 12 which is connected to a display 14, and a memory device 16. Computer 12 is also connected to the input of a digital oscillator is, the output of which is connected to a loud speaker 20. An input amplifier 24 is connected between a cardioid microphone 22 and the input of a filter 26. The output of filter 26 is connected to the input of an analog to digital converter 28 which has its output connected to computer 12.

To implement the method of this invention, the cardioid microphone 2 is positioned within the concert hall or area under test. For clarity it will be assumed that the initial positioning of the microphone will be at 0° (See FIG. 2) on a 360° circle lying in a horizontal plane. Cardioid microphone 22 has a typical heart shaped reception pattern as shown in the figure. Computer 12 of TDS 10 instructs oscillator 18 to transmit via speaker 20 a signal consisting of a plurality of frequencies. The transmitted frequencies are either reflected and/or absorbed in varying degrees by the room. Those frequencies reflected are subsequently received along with the direct signal from the speaker by microphone 22 and will be referred to as the received signals. The received signals are then amplified by amplifier 24 and filtered to remove unwanted signals by filter 26. The received signals are then converted into a digital signal by digital to analog converter 28 and transferred to computer 12. The computer upon receipt of such information generates an ETC which represents the received signal This ETC will be given reference designation as ETC1 ETC1 is stored within the memory 16 of TDS 10 for subsequent calculations upon the gathering of the remaining three ETCs.

Figure 2:
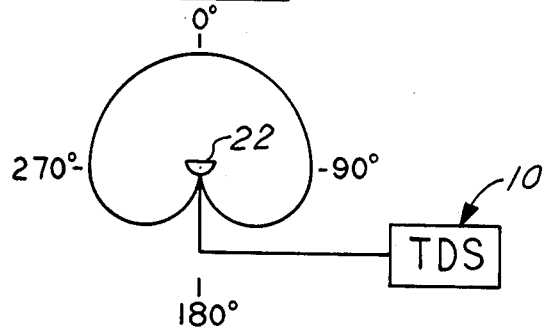
FIG. 2 illustrates the receiving pattern of the cardioid microphone used with the method of this invention as well as the positioning of the cardioid microphone.

The user then positions microphone 22 at the 90° position indicated in FIG. 2. A second ETC, designated ETC2, is generated in the manner described above, i.e. the TDS retransmits the multiple frequency signal, the signal is reflected by the hall and received by the microphone along with the direct signal from the speaker 20. TDS 10 generates and stores ETC2 in its memory 16.

The user then positions microphone 22 at the 180° position indicated in FIG. 2. TDS 10 retransmits the multiple frequency signal which is reflected by the area of the hall in front of the microphone. The reflected signal and direct signal from the speaker are received by microphone 22 and a third ETC designated ETC3 is generated by TDS 10 and stored in its memory for later calculations.

The user positions microphone to the 270° position indicated in FIG. 2. TDS 10 retransmits the multiple frequency signal which is reflected by the area of the hall in front of microphone. The reflected signal is received by microphone 22 and a fourth ETC designated ETC4 is generated and stored by the TDS in the manner described above.

It should be understood that the multiple frequency signal transmitted by TDS 10 in collecting ETC1 is the same multiple frequency signal transmitted for collection of the remaining ETCs. It should be also understood that although the terms reflected and absorbed are used there are varying degrees of reflection which is represented in the ETC by intensity of the received signals. Finally, it should be understood that while the above method is described as using a single microphone it is possible to use a microphone array or a rotating microphone inconjunction with a computer to receive the required signals.

The following calculations and method of using ETC1–ETC4 are based upon the directional characteristic of a directional microphone which is represented by the known equation: $A + [(1-A) \cos \theta]$. Specifically, for a cardioid microphone the directional characteristic is represented by the equation $0.5 + (0.5 \cos \theta)$.

In a cartesian coordinate system if ETC(t) is energy time curve intensity at time t then:

Y axis component = $Y(t) = ETC1(t) - ETC3(t)$

X axis component = $X(t) = ETC2(t) - ETC4(t)$

Then the angle of arrival may be represented by the equation: $\theta(t) = \tan^{-1}[Y(t)/X(t)]$ and the intensity of arrival may be represented by the equation $I(t) = [X^2(t) + Y^2(t)]^{\frac{1}{2}}$. The X and Y components calculated above may be used to display a Polar ETC on screen 14 of TDS 10 where the vector length would be determined by either intensity of the received signals as determined by the X and Y component values or the time of arrival of the X and Y component values, in either case with the angle of arrival $\theta(t)$ being $\theta$. Upon correlation of the four ETCs previously generated and converted into X and Y components, the angle of arrival $\theta(t)$, and the intensity of arrival, TDS 10 can display an image upon its screen 14 which illustrates the acoustical configuration of the hall under test specifically the time, intensity, and direction of arrival of the reflected signal at the position of the microphone. The manner of displaying ETCs upon a video terminal can be obtained by the Tecron Tef system 10/12 machine.

It should be noted that by obtaining four ETCs at 0°, 90°, 180°, 270° in a horizontal plane and two ETCs in a vertical plane at 90° above and 90° below the horizontal plane, a three dimensional space may be described and displayed upon the screen of the TDS using the method above described. The vertical ETCs would be on the Z axis and a user could chose any two of the axes for display or all three for a three dimensional characterization of the area under test.

Therefore, using the above method of collection and correlation of four ETCs in any two dimensional plane of interest or six ETCs in three dimensional space, the intensity, time and direction of arrival can be determined and displayed using a conventional TDS such as the Tecron Tef System 10/12 machine mentioned previously.

I claim:

1. A method of determining and displaying the arrival time, intensity and direction of a signal comprising the steps of:
    (a) transmitting a first signal into an area under test, said first signal including a plurality of frequencies;
    (b) receiving a first received signal through a directional microphone positioned at a first selected position, said first received signal including said first signal frequencies and said first signal frequencies which have been reflected by said area under test;
    (c) converting said first received signal into a first energy time curve indicating time of arrival and intensity at arrival;
    (d) positioning said directional microphone in a second selected position located selectively from said first selected position;
    (e) repeating step a;
    (f) receiving a second received signal through a directional microphone positioned at said second position, said second received signal including said first signal frequencies and said first signal frequencies which have been reflected by said area under test;
    (g) converting said second received signal into a second energy time curve indicating time of arrival and intensity at arrival;
    (h) positioning said directional microphone at a third position located selectively from said first selected position;
    (i) repeating step a;
    (j) receiving a third received signal through a directional microphone positioned a said third position, said third received signal including said first signal frequencies and said first signal frequencies have been reflected by said area under test;
    (k) converting said third received signal into a third energy time curve indicating time of arrival and intensity at arrival;
    (l) positioning said directional microphone at a fourth position located selectively from said first selected position:
    (m) repeating step a;
    (n) receiving a fourth received signal through said directional microphone positioned at said fourth position, said fourth received signal including said first signal frequencies and said first signal frequencies which have been reflected by said area under test;
    (o) converting said fourth received signal into a fourth energy time curve indicating time of arrival and intensity at arrival;

(p) converting said first and third energy time curves into a representative of a Cartesian Y axis component;

(q) converting said second and fourth energy time curves into a representative of a Cartesian X axis component;

(r) converting said X axis component representative and said Y axis component representative into a value for the angle of arrival by the equation $\tan^{-1}[Y/X]$;

(s) displaying said first, second, third, and fourth energy time curves in polar format wherein the time of arrival of said X and Y axis representative components determine the vector length and said angle of arrival equals a theta angle.

2. The method of claim 1 wherein said second position is ninety degrees from said first position, said third position is one hundred eighty degrees from said first position, and said fourth position is one hundred eighty degrees from said second 3. A method of determining and displaying the arrival time, intensity and direction of a signal comprising the steps of:

(a) transmitting a first signal into an area under test, said first signal including a plurality of frequencies;

(b) receiving a first received signal through a directional microphone positioned at a first selected position, said first received signal including said first signal frequencies and said first signal frequencies which have been reflected by said area under test;

(c) converting said first received signal into a first energy time curve indicating time of arrival and intensity at arrival;

(d) positioning said directional microphone in a second selected position located selectively from said first selected position;

(e) repeating step a;

(f) receiving a second received signal through a directional microphone positioned at said second position, said second received signal including said first signal frequencies and said first signal frequencies which have been reflected by said area under test;

(g) converting said second received signal into a second energy time curve indicating time of arrival and intensity at arrival;

(h) positioning said directional microphone at a third position located selectively from said first selected position;

(i) repeating step a;

(j) receiving a third received signal through a directional microphone positioned at said third position, said third received signal including said first signal frequencies and said first signal frequencies have been reflected by said area under test;

(k) converting said third received signal into a third energy time curve indicating time of arrival and intensity at arrival;

(l) positioning said directional microphone at a fourth position located selectively from said first selected position;

(m) repeating step a;

(n) receiving a fourth received signal through said directional microphone positioned at said fourth position, said fourth received signal including said first signal frequencies and said first signal frequencies which have been reflected by said area under test;

(o) converting said fourth received signal into a fourth energy time curve indicating time of arrival and intensity at arrival;

(p) converting said first and third energy time curves into a representative of a Oartesian Y axis component;

(q) converting said second and fourth energy time curves into a representative of a Oartesian X axis component;

(r) converting said X axis component representative and said Y axis component representative into A value for the intensity of arrival by the equation $[X^2+Y^2]^{\frac{1}{2}}$;

(s) converting said X axis component representative and said Y axis component representative into a value for the angle of arrival by the equation $\tan^{-1}[Y/X]$;

(t) displaying said first, second, third, and fourth energy time curves in polar format wherein said value for the intensity of arrival determines the vector length and said angle of arrival equals a theta angle.

4. The method of claim 8 wherein said second position is ninety degrees from said first position, said third position is one hundred eighty degrees from said first position, and said fourth position is one hundred eighty degrees from said second position.

5. A method of determining and displaying the arrival time, intensity and direction of a signal in conjunction with a time delay spectrometer, said time delay spectrometer including a controlling computer connected to a display member and a memory device, said controlling computer also being connected to an oscillator member, said oscillator member connected to an output device, said time delay spectrometer further including a signal input device connected to a signal magnification member which is also connected to a filter member, said filter member being connected to an input on said controlling computer, said method comprising the steps of:

(a) causing said controlling computer to instruct said oscillator member to transmit a first signal into an area under test through said output device, said first signal including a plurality of frequencies;

(b) receiving a first received signal through said signal input device positioned at a first selected position, said first received signal including said first signal frequencies and said first signal frequencies which have been reflected by said area under test;

(c) amplifying said first received signal by said signal magnification member;

(d) filtering said first received signal and inputting said first received signal to said controlling computer through said computer input;

(e) said controlling computer converting said first received signal into a first energy time curve indicating time of arrival and intensity at arrival;

(f) positioning said signal input device in a second position located selectively from said first selected position;

(g) repeating step a;

(h) receiving a second received signal through said signal input device positioned at said second position, said second received signal including said first signal frequencies and said first signal frequencies which have been reflected by said area under test;

(i) amplifying said second received signal by said signal magnification member;

(j) filtering said second received signal and inputting said second received signal to said controlling computer through said computer input;
(k) said controlling computer converting said second received signal into a second energy time curve indicating time of arrival and intensity at arrival;
(l) positioning said signal input device at a third position located selectively from said first position;
(m) repeating step a;
(n) receiving a third received signal through said signal input device positioned at said third position, said third reflected signal including a portion of said first signal frequencies and said first signal frequencies which have been reflected by said area under test;
(o) amplifying said third received signal by said signal magnification member;
(p) filtering said third received signal and inputting said third received signal to said controlling computer through said computer input;
(q) said controlling computer converting said third received signal into a third energy time curve;
(r) positioning said signal input device at a fourth position located selectively from said first selected position;
(s) repeating step a;
(t) receiving a fourth received signal through said signal input device positioned at said fourth position, said fourth received signal including said first signal frequencies and said first signal frequencies which have been reflected by said area under test;
(u) amplifying said fourth received signal by said signal magnification member;
(v) filtering said fourth reflected signal and inputting said fourth received signal to said controlling computer through said computer input;
(w) said controlling computer converting said fourth received signal into a fourth energy time curve;
(x) said controlling computer converting said first and third energy time curves into a representative of a Cartesian Y axis component;
(y) said controlling computer converting said second and fourth energy time curves into a representative of a Cartesian X axis component;
(z) said controlling computer converting said X axis component representative and said Y axis component representative into a value for the angle of arrival by the equation $\tan^{-1}[Y/X]$;
(aa) displaying upon said display member said first, second, third, and fourth energy time curves in polar format wherein the time of arrival of said X and Y axis component representatives determine the vector length and said angle of arrival equals a theta angle.

6. The method of claim 5 wherein said second position is ninety degrees from said first position, said third position is one hundred eighty degrees from said first position, and said fourth position is one hundred eighty degrees from said second position.

7. A method of determining and displaying the arrival time, intensity and direction of a signal in conjunction with a time delay spectrometer, said time delay spectrometer including a controlling computer connected to a display member and a memory device, said controlling computer also being connected to an oscillator member, said oscillator member connected to an output device, said time delay spectrometer further including a signal input device connected to a signal magnification member which is also connected to a filter member, said filter member being connected to an input on said controlling computer, said method comprising the steps of:

(a) causing said controlling computer to instruct said oscillator member to transmit a first signal into an area under test through said output device, said first signal including a plurality of frequencies;
(b) receiving a first received signal through said signal input device positioned at a first selected position, said first received signal including said first signal frequencies and said first signal frequencies which have been reflected by said area under test;
(c) amplifying said first received signal by said signal magnification member;
(d) filtering said first received signal and inputting said first received signal to said controlling computer through said computer input;
(e) said controlling computer converting said first received signal into a first energy time curve indicating time of arrival and intensity at arrival;
(f) positioning said signal input device in a second position located selectively from said first selected position;
(g) repeating step a;
(h) receiving a second received signal through said signal input device positioned at said second position, said second received signal including said first signal frequencies and said first signal frequencies which have been reflected by said area under test;
(i) amplifying said second received signal by said signal magnification member;
(j) filtering said second received signal and inputting said second received signal to said controlling computer through said computer input;
(k) said controlling computer converting said second received signal into a second energy time curve indicating time of arrival and intensity at arrival;
(l) positioning said signal input device at a third position located selectively from said first position;
(m) repeating step a;
(n) receiving a third received signal through said signal input device positioned at said third position, said third reflected signal including a portion of said first signal frequencies and said first signal frequencies which have been reflected by said area under test;
(o) amplifying said third received signal by said signal magnification member;
(p) filtering said third received signal and inputting said third received signal to said controlling computer through said computer input;
(q) said controlling computer converting said third received signal into a third energy time curve;
(r) positioning said signal input device at a fourth position located selectively from said second selected position;
(s) repeating step a;
(t) receiving a fourth received signal through said signal input device positioned at said fourth position, said fourth received signal including said first signal frequencies and said first signal frequencies which have been reflected by said area under test;
(u) amplifying said fourth received signal by said signal magnification member;
(v) filtering said fourth reflected signal and inputting said fourth received signal to said controlling computer through said computer input;

(w) said controlling computer converting said fourth received signal into a fourth energy time curve indicating time of arrival and intensity at arrival;

(x) said controlling computer converting said first and third energy time curves into a representative of a Cartesian Y axis component;

(y) said controlling computer converting said second and fourth energy time curves into a representative of a Cartesian X axis component;

(z) said controlling computer converting said X axis component representative and said Y axis component representative into a value for the intensity of arrival by the equation $[X^2+Y^2]^{\frac{1}{2}}$;

(aa) said controlling computer converting said X axis component representative and said Y axis component representative into a value for the angle of arrival by the equation $\tan^{-1}[Y/X]$;

(bb) displaying upon said display member said first, second, third, and fourth energy time curves in polar format wherein said representative value for the intensity of arrival determine the vector length and said angle of arrival value equals a theta angle.

8. The method of claim 7 wherein said second position is ninety degrees from said first position, said third position is one hundred eighty degrees from said first position, and said fourth position is one hundred eighty degrees from said second position.

* * * * *